United States Patent Office 2,839,505
Patented June 17, 1958

2,839,505

POLYMERS OF O-P-TOLUYL-BENZOIC ACIDS

Sidney D. Ross, Williamstown, and Meyer Schwarz, North Adams, Mass., assignors to Sprague Electric Company, North Adams, Mass., a corporation of Massachusetts No Drawing. Application February 4, 1955
Serial No. 486,281

4 Claims. (Cl. 260—63)

This invention relates to and has for its object the provision of a new class of polymers and methods for their preparation.

It is known that substances, such as benzoyl-benzoic

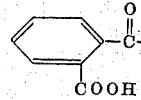

acid, will ionize in sulfuric acid in accordance with the following equations:

(1)

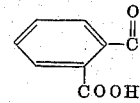

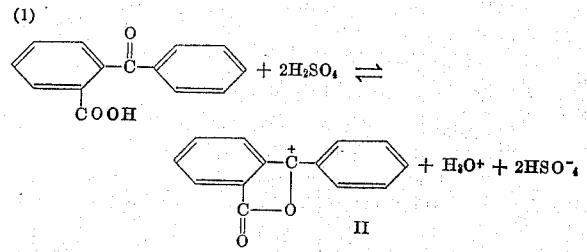

With p-toluyl-o-benzoic acid (or any other p-lower alkyl-benzoyl-o-benzoic acid), a similar ionization takes place in sulfuric acid. The bisulfate ion resulting from the ionization, however, is too weak a base to abstract a proton from the ionized benzoyl-benzoic acid and no further condensation takes place. But when the p-toluyl-o-benzoic acid is dissolved in a polyphosphoric, or any other acid forming a conjugate base of appropriate strength, a more complex ionization reaction takes place and the quinonoid-type molecule (VII) results.

(3)

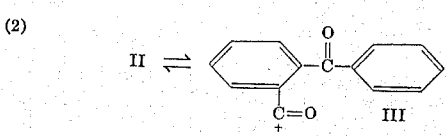

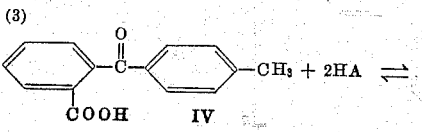

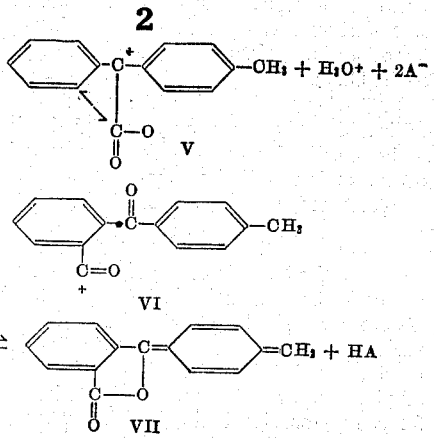

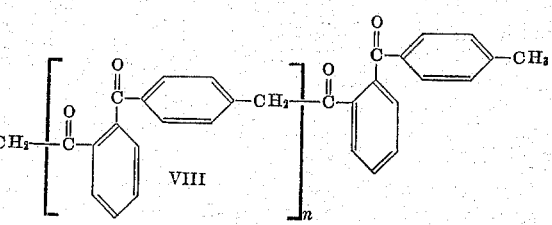

The resulting ions V and VI will undergo polymerization with VII to form products having the structure

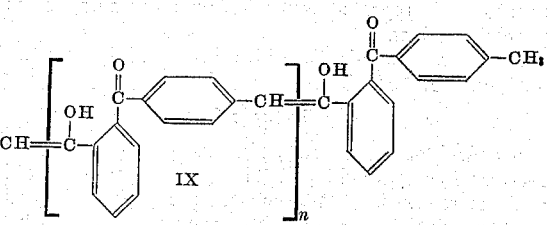

wherein $n$ is a whole number. This compound, in enolic form, has the structure

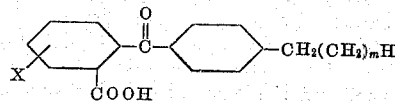

In the condensation of the invention it is preferred to use p-toluyl-o-benzoic acid for polymerization. However, other derivatives may be also used. Thus, the present invention includes polymerization of acids of the general formula wherein X is lower alkyl (e. g. methyl, ethyl, propyl, isopropyl, etc.), lower alkoxy (e. g. methoxy, ethoxy, isopropoxy, etc.), halo (chloro, bromo, iodo and fluoro), sulfo, nitro, etc. and $m$ is a whole number from 0 to 7. As the strong dehydrating acid used in the polymerization reaction, it is preferred to use either a polyphosphoric acid or perfluoro butyric anhydride. However, other perhalo lower fatty acid anhydrides (especially the perfluoro lower fatty acid anhydrides) may be utilized provided that they adequately produce a sufficiently strong conjugate base. As to reaction conditions, it is possible to operate within wide ranges. Normally the amount of dehydrating agent used is approximately equivalent to that of the p-lower alkyl-benzoyl-o-benzoic acid monomer. However, smaller or larger quantities of this agent may be used. Likewise, although reflux temperatures may be desirable in many cases, the use of that degree of elevated temperature is not absolutely necessary. Thus, temperatures as low as about 50° C. to reflux temperatures may be utilized. The polymers of the invention are useful as dyestuffs or pigments and may be incorporated in the usual manner with carriers and drying agents for use in paints or inks. The polymers may also be used as dielectrics for any of the obvious electrical applications. Furthermore, these materials, having free carboxyl groups, may be further condensed with fiber-forming polyamides (e. g. nylon) to impart color to the fibers.

Following are specific examples of the procedures utilizable to form the polymers of the invention. It is to be specifically understood, however, that the present invention is not limited thereto, and that the examples are presented as illustrative only.

Example 1

*p-Toluyl-o-benzoic acid polymer.*—A mixture of 50 g. p-toluyl-o-benzoic acid in 500 g. tetraphosphoric acid (Victor) is heated at 70–75° for 20 hours. To the dark, viscous reaction mixture is added cold water and the red product, which is obtained, is dried then washed with ethyl ether to remove unreacted starting material. About 32 g. polymer is obtained. This crude product is then extracted continuously with acetone; and the resulting acetone solution is concentrated to a volume of 300 cc., and the product is precipitated by adding hexane. The product is purified further by redissolving in acetone and reprecipitating with hexane; yield about 16 g. [Treatment with a base (e. g. NaOH) yields the salt.]

*Analysis.*—Found: C, 80.49, 80.53; H, 4.63, 4.71; mol. wt., 1610, 1450 ebullioscopic in chloroform; neutral equivalent, 2100, 1940.

These values are in good agreement with the calculated values for a polymer having $n=5-7$.

The material insoluble in acetone is dissolved in chloroform and precipitated with hexane. This purification procedure is repeated two additional times to obtain a purified product.

*Analysis.*—Found: C, 76.51, 77.00, 76.58, 76.72; H, 4.56, 4.38, 5.01, 4.86.

Example 2

*p-Toluyl-o-benzoic acid polymer.*—A mixture of 24 g. o-p-toluylbenzoic acid and 24 g. perfluorobutyric anhydride is refluxed for 1 hour and the dark red reaction mixture which is obtained is poured into ice water; the solid which precipitates is dried and washed with two, 300 ml. portions of dry ethyl ether to remove unreacted starting material. The crude product is then dissolved in 500 ml. 10% sodium hydroxide and reprecipitated with dilute (10%) hydrochloric acid. The precipitate is then separated by filtration and dried to constant weight, yielding about 20 g. polymer, M. P. 160–170° C. with decomposition. The product is then dissolved in boiling ethanol and the resulting solution is allowed to cool to room temperature. The portion which separates on cooling, about 3–4 g., melts at 214–220° C. with decomposition and analyses indicate that $n$ for this polymer is 3–5. [Treatment with a base (e. g. NaOH) yields the salt.]

*Analysis.*—Found: C, 79.78, 80.06; H, 4.61, 4.69; neutral equivalent 1284; mol. wt., 1460, 1330, ebullioscopic in butanone.

Evaporation of the ethanol from the filtrate yields a product, about 15 g., which melts at 140–150° C. with decomposition and analyses indicate that $n=0-1$.

*Analysis.*—Found: C, 79.11, 79.39; H, 4.91, 4.86; mol. wt., 542, 580; ebullioscopic in chloroform; 560, ebullioscopic in benzene.

A sample from another preparation gave the following results:

*Analysis.*—Found: C, 78.31, 78.44; H, 5.04, 4.86; neutral equivalent, 570; mol. wt., 526, 537; ebullioscopic in butanone.

Example 3

*Reduction of the p-toluyl-o-benzoic acid polymer.*—About 10 g. mossy zinc is amalgamated with 1 g. mercuric chloride in 15 ml. water containing 0.5 ml. HCl (conc.). The aqueous layer is decanted and 7.5 ml. water, 17.5 ml. concentrated hydrochloric acid, 10 ml. toluene, 0.5 ml. acetic acid and 5 g. polymer soluble in cold ethanol is added. The mixture is then refluxed 40 hours, while adding, at 6 hour intervals, 0.5 g. fresh zinc dust, 10 ml. concentrated hydrochloric acid and 25 ml. toluene. The reaction mixture is filtered and extracted with toluene. The toluene extract is dried and the toluene is evaporated to yield about 3.7 g. straw-colored product. This product is purified further by twice dissolving it in acetone and precipitating it with hexane; and the purified product may be neutralized with a basic material (e. g. KOH) to form a salt.

*Analysis.*—Found: C, 82.08, 82.52, 81.47, 82.00; H, 5.54, 5.99, 5.76, 5.81; ash, 0, 0.52, 0.09, 0.50; neutral equivalent, 569; mol. wt., 488, 492, ebullioscopic in butanone.

This same procedure applied to the polymer soluble in acetone gave a straw-colored product with a neutral equivalent of 1800. The neutral equivalent prior to reduction was 1900–2100.

Example 4

Following the procedure of Example 1 except that an equivalent amount of p-ethylbenzoyl-o-benzoic acid is substituted for the p-toluyl-o-benzoic acid of the reference example, the homologous polymers (and salts thereof) are obtained. Reduction of these polymers as described in Example 3, yields the corresponding reduction products.

Example 5

Following the procedure of Example 2 except that an equivalent amount of perfluoroacetic acid anhydride is substituted for the perfluorobutyric acid anyhdride of the reference example, similar polymers are obtained.

Example 6

Following the procedure of Example 2 except that an equivalent amount of perchlorobutyric acid anhydride is substituted for the perfluorobutyric acid anhydride of the reference example, similar polymers are obtained.

The invention may be variously otherwise embodied within the scope of the appended claims.

We claim:

1. A process for polymerizing an o-p-toluyl benzoic acid which comprises heating said acid in the presence of a strong dehydrating acid at a temperature in the range of from about 50° C. to a refluxing temperature of the group consisting of polyphosphoric acid and anhydrides of perfluorinated aliphatic acids, and separating the polymerized product from the reaction mixture.

2. Compounds of the general formula

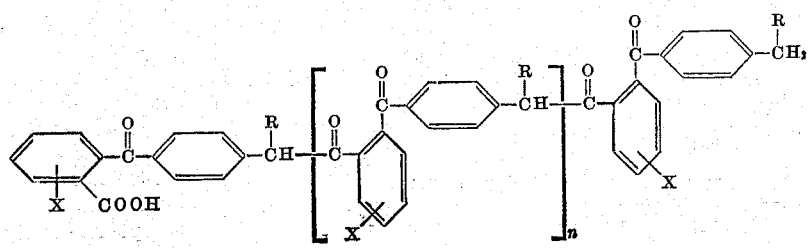

where R is any of the group consisting of hydrogen and the alkyls; $n$ is a number of from 0 to 10; and X is any alkyl group.

3. P-toluyl-o-benzoic acid polymer having the formula

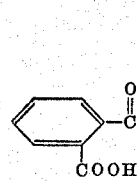
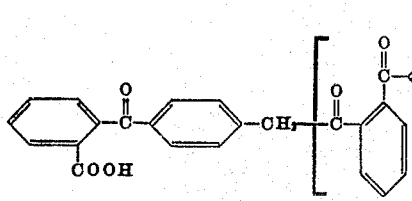

where $n$ is a number of from 0 to 10.

4. Reduced p-toluyl-o-benzoic acid polymer having the formula

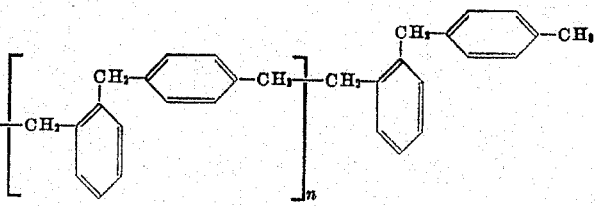
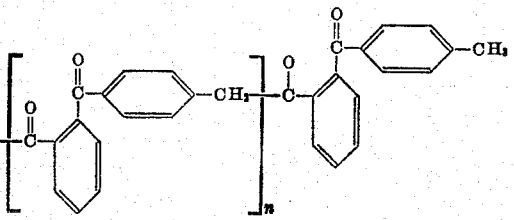

where $n$ is a number of from 0 to 10.

References Cited in the file of this patent
UNITED STATES PATENTS

| | | |
|---|---|---|
| 1,813,838 | Bruson | July 7, 1931 |
| 2,187,565 | Bruson et al. | Jan. 16, 1940 |
| 2,461,301 | Tawney | Feb. 8, 1949 |

OTHER REFERENCES

Whitmore, "Organic Chemistry," p. 835, Van Norstrand (1937). (Copy in Library.)